Figure 1:
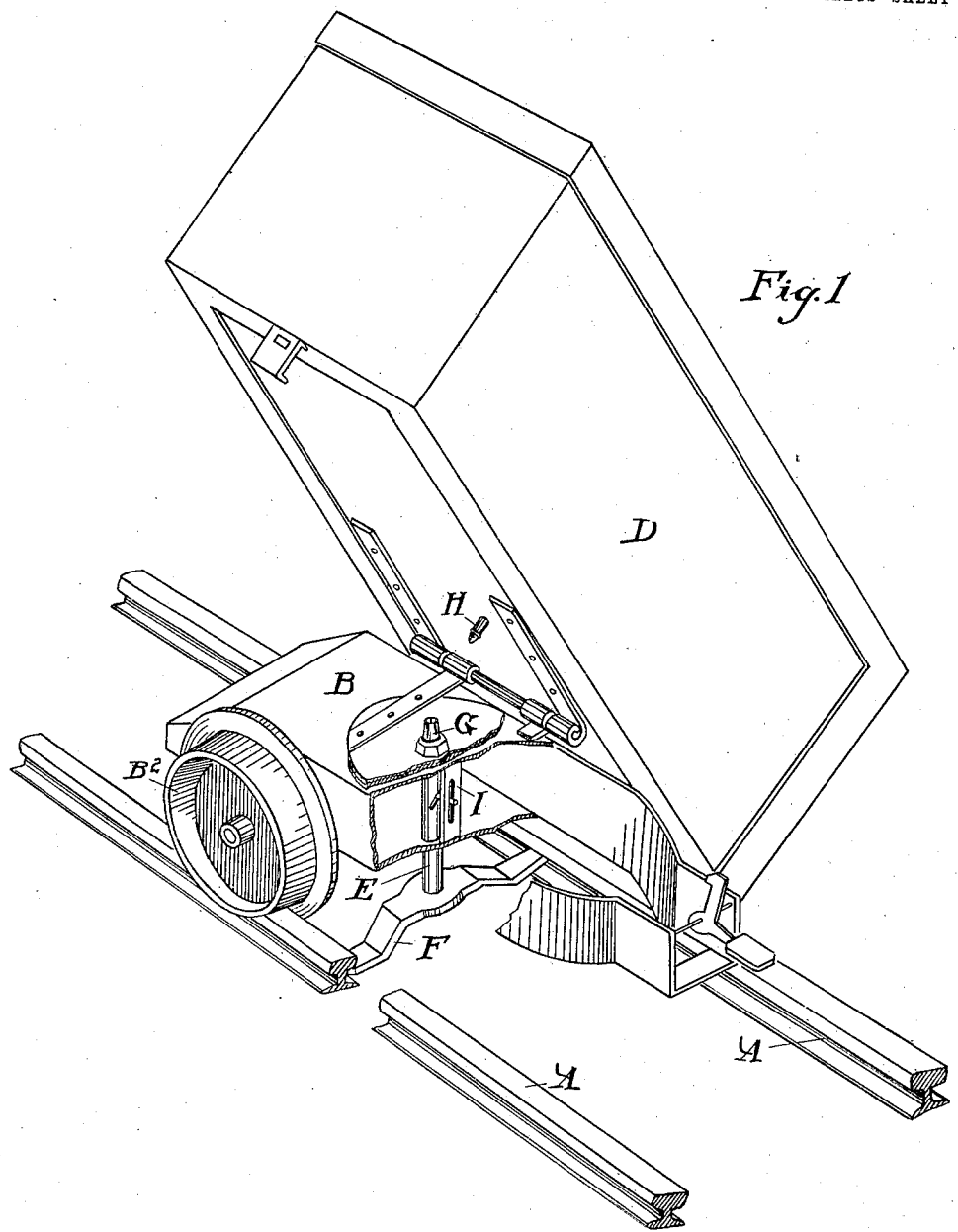

No. 737,454. PATENTED AUG. 25, 1903.
G. G. NEWCOMB.
DEVICE FOR LOCKING CARS TO RAILS OR TRACKS.
APPLICATION FILED JULY 20, 1901. RENEWED JUNE 29, 1903.
NO MODEL.
2 SHEETS—SHEET 1.

WITNESSES
Frances Montgomery
Forest B. Higgins

INVENTOR
George G. Newcomb.
By
ATTORNEY.

No. 737,454. PATENTED AUG. 25, 1903.
G. G. NEWCOMB.
DEVICE FOR LOCKING CARS TO RAILS OR TRACKS.
APPLICATION FILED JULY 20, 1901. RENEWED JUNE 29, 1903.
NO MODEL. 2 SHEETS—SHEET 2.
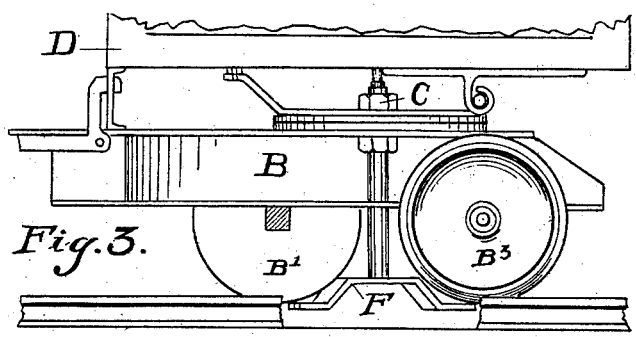
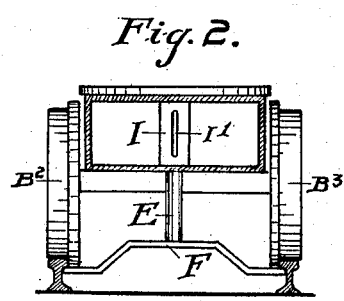
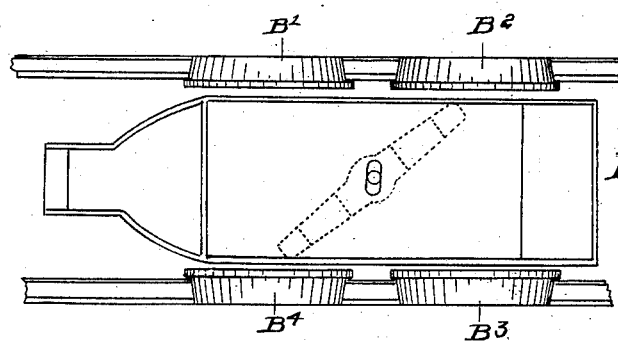
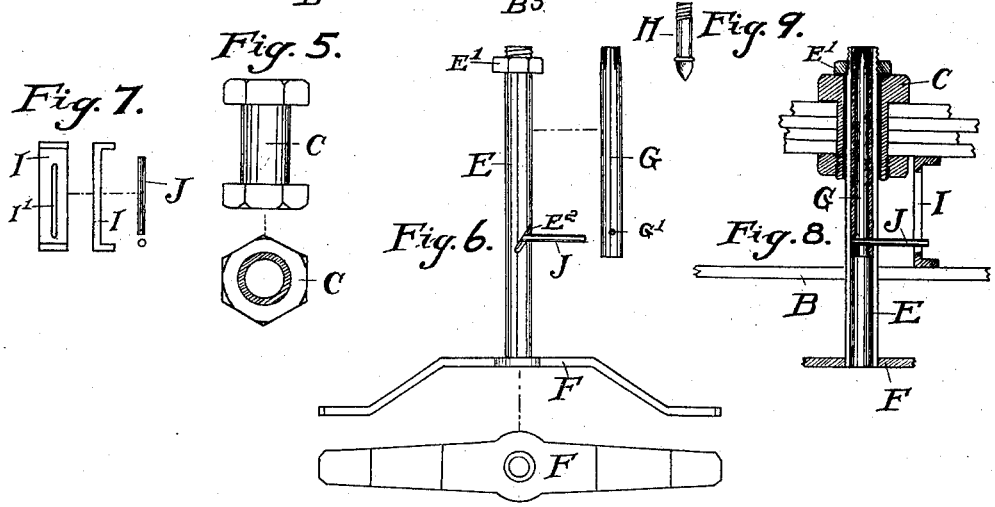
WITNESSES
Francis Montgomery.
Forest B. Higgins.
INVENTOR
George G. Newcomb
By
ATTORNEY.

No. 737,454.

Patented August 25, 1903.

UNITED STATES PATENT OFFICE.

GEORGE G. NEWCOMB, OF DENVER, COLORADO.

DEVICE FOR LOCKING CARS TO RAILS OR TRACKS.

SPECIFICATION forming part of Letters Patent No. 737,454, dated August 25, 1903.

Original application filed May 21, 1900, Serial No. 17,360. Divided and this application filed July 20, 1901. Renewed June 29, 1903. Serial No. 163,658. (No model.)

*To all whom it may concern:*

Be it known that I, GEORGE G. NEWCOMB, a citizen of the United States, residing at Denver, in the county of Arapahoe and State of Colorado, have invented certain new and useful Improvements in Devices for Locking Cars to the Rails or Tracks; and I do declare the following to be a full, clear, and exact description of my invention, such as will enable others skilled in the art to which it appertains to make and use the same, reference being had to the accompanying drawings, forming a part of this specification, in which similar letters of reference indicate corresponding parts in all the figures.

My invention relates to a class of devices designed to lock cars to the track while dumping.

The objects of my invention are to provide a device for locking cars to the track that will be practical and effective and will work automatically with the dumping and replacing of the box of the car.

The above objects are derived by the construction outlined in the drawings, in which—

Figure 1 is a perspective elevation, partly sectional, showing my device locking the car to the track while side-dumping. Fig. 2 is an end view of the truck. Fig. 3 is a side elevation, partly sectional and fragmental, of the car and truck having my device attached thereto. Fig. 4 is a view looking down upon the truck and track. Fig. 5 is a view of the hollow king-bolt. Fig. 6 is a view of the mandrels. Fig. 7 is a view of the guiding-plate and pin. Fig. 8 is a fragmental cross-section showing the mandrel, the king-bolt, and guiding-plate. Fig. 9 is a view of the spud.

A A represent the ordinary T-rails used in constructing tracks for ore-cars.

B represents the frame of the truck, which is mounted upon four flanged wheels, (designated by $B'$, $B^2$, $B^3$, and $B^4$.)

C represents a hollow cylindrical king-bolt which I employ to attach the box of the car D to the frame B instead of the ordinary ones now in use. The mandrel E is then passed through the hollow king-bolt and the nut $E'$ allowed to rest upon the upper end of the king-bolt. This mandrel E is the means of supporting and operating the cross-bar or locking-bar, (represented by F,) as it is attached to the lower end of the said mandrel.

G represents a mandrel of smaller diameter than the one indicated by E and is preferably made of good tensile-strength steel and adapted to operate loosely within the large mandrel, (represented by E.) The upper end of the small mandrel is constricted and slightly turned in, being also slitted or sawed to permit of expanding, adapted to admit the flanged spud, (indicated by H,) which is secured to the bottom of the box D, as fully illustrated in Fig. 1 of the drawings.

I represents a guiding-plate which is secured to the frame of the truck. This guiding-plate is provided with an elongated slot (indicated by $I'$ in Fig. 7 of the drawings) in which operates the pin J, which is passed through the spiral slot $E^2$, provided in the mandrel E and is then secured into the inner mandrel G at a point designated by $G'$ in Fig. 6.

After constructing my device according to the illustrations herewith and the foregoing description manifestly the successful operation of same will be as follows: The pin J, which is rigidly secured into the inner mandrel G, is of sufficient length to pass outward through the spiral slot $E^2$, provided in the mandrel E, and thence through the elongated perpendicular slot $I'$ in the guiding-plate I. The flanged spud H, Fig. 1, comes down and inserts into the slitted constricted end of the inner mandrel G. The strength of the sawed or slitted end of this inner mandrel is sufficient to grasp the flanged spud H with rigidity enough to draw the mandrel upward when the car is raised to dump, and as the upward movement of the inner mandrel draws with it the pin J, which is secured into the inner mandrel, it causes the large mandrel E, by means of the spiral slot $E^2$, to rotate, which swings the locking-bar, causing the ends of it to lock under the flanges of the rails. After the load has been dumped and the box *d*, Fig. 1, drawn backward to its place the flanged spud enters the inner mandrel and presses it downward, which causes the large mandrel E to rotate in an opposite direction to the former movement, thus releasing the cross-bar from the flanges of the rails, and swings it back into the position shown in Fig. 4 of the drawings. It requires but a slight tilting of the box D to raise the inner mandrel sufficiently to throw the cross-bar under the flanges of the rails. The flanged spud withdraws from the constricted top of the inner mandrel when it has been drawn upward far enough to have thrown the locking-bar into the position shown in Fig. 1.

I desire to construct my new device in the most practical and efficient manner without deviating from the principle involved and to make it in various sizes and of such material as will be found most practical and efficient for the uses and purposes for which it is adapted.

What I claim as new, and desire to secure by Letters Patent of the United States, is—

1. In a device for locking cars to the rails or track having the cross-bar, which locks under the flanges of the T-rails forming the track, secured to a hollow cylindrical mandrel or journal which is secured to the truck, the hollow mandrel is supplied with a spiral slot by means of which it is turned by the pin which is secured into the inner mandrel and extends outward through the spiral slot and through the elongated slot in the guiding-plate, having the inner mandrel constricted at the top and sawed or slitted, and the flanged spud secured to the bottom of the box of the car designed to operate the locking device, substantially as specified.

2. In a device for locking cars to the rails or track having the hollow cylindrical king-bolt through which is inserted the large hollow mandrel being secured by means of a nut which rests upon the upper end of the king-bolt, the large mandrel being provided with a spiral slot and having within itself a mandrel of smaller diameter which has rigidly secured to it a pin extending outward through the spiral slot, thence through the elongated slot in the guiding-plate, the guiding-plate being secured to the truck and having the cross-bar designed to lock under the flanges of the rails secured to the lower end of the large mandrel, substantially as specified.

3. In a device for locking cars to the rails or track having the hollow cylindrical king-bolt designed to encircle and secure the large hollow mandrel, to this mandrel is attached the cross-bar, it is also provided with a spiral slot and has working within itself the mandrel of less diameter which is constricted at the top and sawed or slitted, this inner mandrel having secured to it the pin which extends outward through the spiral slot which is provided in the outer mandrel; and having the guiding-plate provided with the elongated slot which guides the pin; also having the flanged spud secured to the bottom of the box which inserts into the constricted or sawed end of the inner mandrel and by this means raises and lowers the same which adjusts the cross-bar, substantially as specified.

4. In a device for locking cars to the rails or track, the hollow cylindrical king-bolt C, the mandrel E provided with the nut E' inserted through the said hollow cylindrical king-bolt, the small mandrel G constricted at the top and sawed or slitted working within the mandrel E, the pin J secured into the mandrel G which extends outward through the spiral slot E² through the elongated slot I' in the guiding-plate I, the cross-bar F secured to the mandrel E designed to lock under the flanges of the rails A, A and the flanged spud H attached to the box D of the car, as and for the uses and purposes herein fully set forth and substantially specified.

In testimony that I claim the foregoing as my own I hereunto subscribe my name in the presence of two witnesses.

GEORGE G. NEWCOMB.

Witnesses:
FRANCES MONTGOMERY,
FOREST B. HIGGINS.